(No Model.)
G. T. SUTTERLEY.
BRACE.
No. 401,604. Patented Apr. 16, 1889.
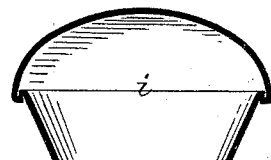
FIG. 1.
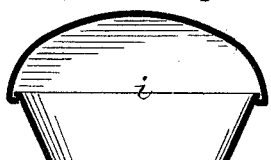
FIG. 2.
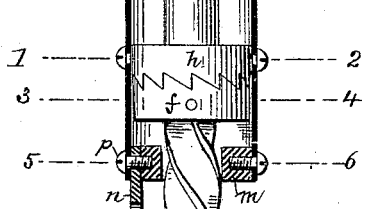
FIG. 8.
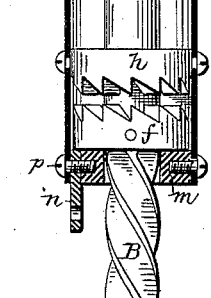
FIG. 3.  FIG. 6.
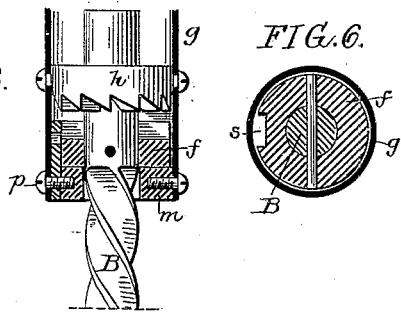
FIG. 5.  FIG. 7.  FIG. 4.
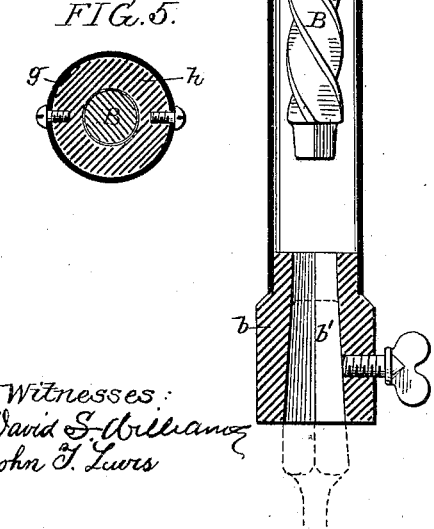
Witnesses:
David S. Williams
John T. Lewis
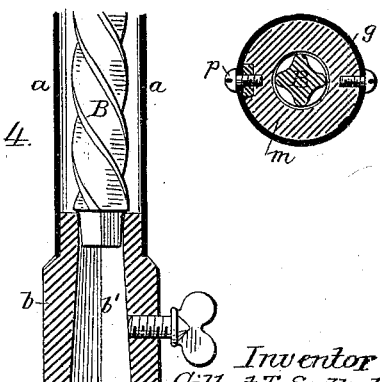
Inventor
Gilbert T. Sutterley
by his Attorneys
Howson & Howson

UNITED STATES PATENT OFFICE.

GILBERT T. SUTTERLEY, OF PHILADELPHIA, PENNSYLVANIA.

BRACE.

SPECIFICATION forming part of Letters Patent No. 401,604, dated April 16, 1889.

Application filed November 12, 1888. Serial No. 290,577. (No model.)

*To all whom it may concern:*

Be it known that I, GILBERT T. SUTTERLEY, a citizen of the United States, and a resident of Philadelphia, Pennsylvania, have invented certain Improvements in Braces for Screw-Drivers, &c., of which the following is a specification.

My invention relates to that class of braces for screw-drivers and like tools in which the rotation of the body or shank of the brace carrying the driving-bit is effected by the engagement of a longitudinally-moved screw-stem with a nut carried by the shank of the brace, the screw-stem itself turning on the backward movement, so as not to impart any rotating movement to the tool.

The objects of my invention are to cheapen and simplify the construction of a brace of this class, to render unnecessary the employment of any springs in connection therewith, to insure the effective application of power when the brace is used to turn the screw in the ordinary way, and to provide for the use of the brace for backing off a screw when desired.

In the accompanying drawings, Figure 1 is a longitudinal section of a brace for screw-drivers constructed in accordance with my invention. Figs. 2, 3, and 4 are sectional views of parts of the same, showing the moving parts in different positions. Fig. 5 is a sectional plan view on the line 1 2, Fig. 1. Fig. 6 is a sectional plan view on the line 3 4, Fig. 1. Fig. 7 is a sectional plan on the line 5 6, Fig. 1; and Fig. 8 is a view illustrating a modification.

A is the main tubular body or shank of the brace, which consists, preferably, of a sheet-metal tube, $a$, secured at its lower end to a block, $b$, with square or other polygonally-shaped recess $b'$ for the reception of the stem of the screw-driving bit, the tube being secured at its upper end to a block, $d$, forming a nut for the reception of a screw-stem, B, the upper end of which is provided with a collar, $f$, which I term a "driving-collar."

Fitting over the collar $f$ is a tube, $g$, secured to the handle $i$, and to this tube are secured rings $h$ and $m$, between which is located the collar $f$, the distance between the rings being such that a slight longitudinal play of the handle $i$ on the screw-stem B is permitted. The upper face of the collar $f$ is toothed or roughened, and the under face of the ring $h$ is correspondingly toothed or roughened for engagement therewith, while the central openings in both rings $h$ and $m$ are of such size that the upper portion of the screw-stem B can turn freely in said openings, that portion of the stem above the collar $f$ being preferably circular in cross-section, so that it may fit snugly in the ring $h$ without any interference with its turning movement.

The ring $h$, I term a "drive-ring," and the ring $m$ a "stop-ring," as the latter serves to limit the rise of the handle on the stem B.

It will be observed that if the tool carried by the brace is adapted to the nick of a screw when the stem B is retracted, and pressure is then imparted to the handle $i$, so as to drive the same forward, the first effect of the movement will be to cause the engagement of the drive-ring $h$ of the handle with the driving-collar $f$ of the screw-stem, as shown in Fig. 1, so as to lock the screw-stem and handle together and prevent any rotation of said stem independently of the handle, which, being held in the hand, is not at liberty to turn. As the screw-stem is thrust forward, therefore, it must cause the rotation of the nut $d$ and of the shank A, carrying the same, so that the screw-driving bit and the screw with which it is in engagement will be turned forward. On retracting the handle, however, the first effect of the movement is to withdraw the drive-ring $h$ from engagement with the collar $f$, as shown in Fig. 2, so that, as the screw-stem is being withdrawn it is free to turn within the handle, and hence will impart no movement whatever to the nut $d$ or shank A; but upon again pressing the handle forward the ring $h$ will be locked to the collar $f$ and the screw-stem will be prevented from turning, as before.

The lower end of the screw-stem B is squared or otherwise shaped so as to engage with the opening $b'$ in the block $b$ at the lower end of the shank A, as shown in Fig. 4, when it is desired to lock the screw-stem to the shank A for the purpose of turning the screw-driving bit by means of the handle $i$ in the usual way, the power being thus applied to the shank A directly at the point where the screw-driving bit engages with it, so that the application of power is much more effective than if the screw-stem or handle was locked to the nut $d$ at the upper end of the shank, as in such case the power would have to be transmitted through the entire length of the shank, and unless the latter was of substantial character it would be likely to be twisted or distorted, for it will be understood that the power exerted in driving the screw by hand in the ordinary way is greater than that exerted by the joint action of the screw-stem B and nut $d$, the latter being intended mainly for the first part of the operation, which is comparatively easy, and the screw being driven home by turning the brace in the same manner as an ordinary screw-driver. In this case the strain is transmitted from the bit-holding end of the shank directly to the screw-stem, which is amply strong enough to resist such strain, the light sheet-metal casing of the shank being relieved from the strain, and hence not subject to injury when the brace is used in this way.

There may be cases in which it is desirable to use the brace for backing off a screw on the retraction of the stem B, and in such cases the lower ring, $m$, of the handle should be locked to the collar $f$ on the back movement. For this reason I provide the ring with a longitudinal bolt, $n$, which is confined to the ring by a set-screw, $p$. The bolt has two openings for the reception of the screw, and normallly the bolt is depressed, so as to be out of the way of the collar; but it can, when occasion requires, be raised, as shown in Fig. 3, so as to engage with a recess, $s$, in the collar, and thus lock the latter to the ring on the backward movement of the handle. As the handle is held firmly in the hand, the screw-stem B is thus prevented from turning as it is retracted; hence the nut $d$, and with it the shank and bit-holder, must, on the retraction of the screw-stem, be turned backward, so as to back off the screw. It will be understood that as the handle is drawn back by one hand the shank A is held in the other hand, and, while permitted to turn, is pressed forward by the hand with sufficient force to prevent the screw-driving bit from being withdrawn from the nick in the head of the screw. In other words, the forward pressure exerted on the shank A is somewhat greater than the backward pull upon the handle carrying the screw-stem B. When depressed, the bolt $n$ by contact with the top of the nut $d$ prevents such depression of the screw-stem B as would cause its lower end to enter the opening in the block $b$.

It will be observed that in my improved brace there are but few parts, that these parts are of simple and inexpensive character, and that no reliance whatever is placed upon springs for insuring the operation of any part of the tool. The general construction of the tool is also of an inexpensive character, as the block $b$, nut $d$, collar $f$, and rings $h$ and $m$ can be simple castings, requiring no expensive fitting, the tubes $a$ and $g$ can be cut from long lengths, and the handle $i$ can be readily spun into the required shape.

All of the working parts of the tool, moreover, are protected by the tubular casing, so that accidental injury to said parts is prevented.

The stop-ring $m$ may, if desired, be carried by the screw-stem, the drive-ring $h$ of the handle being in this case located between said stop-ring and the driving-collar of the stem, as shown, for instance, in Fig. 8.

Having thus described my invention, I claim and desire to secure by Letters Patent—

1. The combination of the shank of the brace having the bit-holder and nut, the handle having a drive-ring, the screw-stem having a driving-collar for engagement with said ring, and a stop-ring for limiting the longitudinal movement of the handle on the stem, all substantially as specified.

2. The combination of the shank having a bit-holder and nut, the screw-stem engaging with the nut and having a driving-collar at the upper end, and the handle having an internal drive-ring and stop-ring, one above and the other below the driving-collar on the stem, all substantially as specified.

3. The combination of the shank having a bit-holder and nut, the screw-stem engaging with said nut, a driving-collar, a drive-ring and a stop-ring, and the handle comprising the hollow spun head, and a tube containing and inclosing said rings and collar, all substantially as specified.

4. The combination of the shank of the implement having a bit-holder and nut, with the screw-stem engaging with said nut and having its lower end formed for engagement with an opening in the bit-holder, all substantially as specified.

5. The combination of the shank having a bit-holder and nut, the screw-stem engaging with the nut and having a driving-collar, and the loose handle having a drive-ring and stop-ring, and a locking-bolt for securing the handle to the driving-collar independently of the drive-ring, all substantially as specified.

In testimony whereof I have signed my name to this specification in the presence of two subscribing witnesses.

GILBERT T. SUTTERLEY.

Witnesses:
WILLIAM D. CONNER,
HARRY SMITH.